US009351552B1

(12) United States Patent
McNeil et al.

(10) Patent No.: US 9,351,552 B1
(45) Date of Patent: May 31, 2016

(54) TABLET DEVICE FLEXIBLE HARNESS (GRIP)

(71) Applicants: Donald H. McNeil, Wyalusing, PA (US); James R. Thompson, Smithville, OH (US)

(72) Inventors: Donald H. McNeil, Wyalusing, PA (US); James R. Thompson, Smithville, OH (US)

( * ) Notice: Subject to any disclaimer, the term of this patent is extended or adjusted under 35 U.S.C. 154(b) by 0 days.

(21) Appl. No.: 14/726,726

(22) Filed: Jun. 1, 2015

(51) Int. Cl.
*H04W 88/02* (2009.01)
*A45C 11/00* (2006.01)
*A45F 5/00* (2006.01)

(52) U.S. Cl.
CPC . *A45C 11/00* (2013.01); *A45F 5/00* (2013.01); *A45C 2011/003* (2013.01)

(58) Field of Classification Search
CPC .......... A45C 11/00; A45F 5/00; H04W 88/02
See application file for complete search history.

(56) References Cited

U.S. PATENT DOCUMENTS

| | | | | |
|---|---|---|---|---|
| 8,616,422 B2 * | 12/2013 | Adelman | ................. | A45F 5/00 224/191 |
| 2008/0017541 A1 * | 1/2008 | Kittayapong | .......... | A45C 11/00 206/521 |
| 2009/0009945 A1 * | 1/2009 | Johnson | ................ | G06F 1/1613 361/679.27 |
| 2009/0020570 A1 * | 1/2009 | Chan | ......................... | A45F 5/00 224/222 |
| 2009/0159630 A1 * | 6/2009 | Ko | ............................ | A45F 5/00 224/648 |
| 2009/0219677 A1 * | 9/2009 | Mori | ......................... | A45F 3/14 361/679.03 |
| 2010/0171021 A1 * | 7/2010 | Smith | ..................... | A45C 13/30 248/558 |
| 2010/0203931 A1 * | 8/2010 | Hynecek | ................ | A45C 11/00 455/575.8 |
| 2011/0031287 A1 * | 2/2011 | Le Gette | ................ | F16M 11/04 224/101 |
| 2011/0034221 A1 * | 2/2011 | Hung | ..................... | A45C 11/00 455/575.8 |
| 2011/0267748 A1 * | 11/2011 | Lane | ......................... | A45F 5/00 361/679.01 |
| 2011/0278885 A1 * | 11/2011 | Procter | ............... | B60R 11/0235 297/135 |
| 2011/0303579 A1 * | 12/2011 | Sanders | .................... | A45F 5/00 206/701 |
| 2012/0024741 A1 * | 2/2012 | Beatty | .................... | A45C 11/00 206/521 |
| 2012/0025684 A1 * | 2/2012 | Trotsky | ................ | F16M 11/043 312/334.1 |
| 2012/0043235 A1 * | 2/2012 | Klement | ................ | A54C 11/00 206/320 |
| 2012/0048873 A1 * | 3/2012 | Hyseni | ...................... | A45F 5/00 220/752 |
| 2012/0224323 A1 * | 9/2012 | Yang | .................... | F16M 11/041 361/679.55 |
| 2012/0247983 A1 * | 10/2012 | Maravilla | .................. | A45F 5/00 206/216 |
| 2012/0261930 A1 * | 10/2012 | Bethea | ...................... | A45F 5/00 294/25 |
| 2012/0267409 A1 * | 10/2012 | Chavis | ...................... | A45F 5/00 224/579 |
| 2013/0032617 A1 * | 2/2013 | Adelman | .................. | A45F 5/00 224/191 |

* cited by examiner

*Primary Examiner* — Brian D Nash
(74) *Attorney, Agent, or Firm* — McKee, Voorhees & Sease, PLC

(57) ABSTRACT

A harness is provided for a tablet computer having a display side and an opposite back side. The harness includes a one-piece harness body formed of a single material and shaped to fit against the back side of the tablet computer. There is an opening in the harness body proximate a center of the harness body. There is a first strap extending across the harness body proximate a center of the harness body.

18 Claims, 6 Drawing Sheets

TABLET DEVICE FLEXIBLE HARNESS (GRIP)

FIELD OF THE INVENTION

The present invention relates to the field of human factors and ergonomics. More specifically, the present invention relates to a physical harness grip which makes easier and more comfortable the holding, positioning, and securing against physical accidents of typical tablet devices such as the Apple IPAD® and other hand-held devices, especially those which have screen diagonals greater than six (6) inches.

BACKGROUND OF THE INVENTION

In the years since the introduction of the Apple IPAD®, tablet computers have improved rapidly to include not only a wide range of applications but also a complement of peripheral facilities such as cameras, audio recording and playback, global position sensing, accelerometers, telephone functions, and Internet access. Except for a few "hardened" devices, most of these tablets are delivered with sleek, smooth, rectangular, and rather sensitive form factors. Also, there tend to be many spots on screen and off screen which are sensitive to human touch, often by accident. Relatively small devices such as those with screen diagonals less than six (6) inches can be cradled easily in one hand and used as they are engineered to be, but larger devices become clumsy when held in hand for a variety of their uses, especially those devices which have narrow bezels and/or numerous "hot spots" around the periphery. Accidental activation of undesired functions at inappropriate times, fumbling to hold a device while activating desired functions, and outright dropping of the device are common, even for well-coordinated users. Covers, folders, and holsters offer some conveniences and protections, but usually at the cost of adding size, introducing clumsiness, and/or covering over some essential functions. What is needed is an improved way of holding such devices.

BRIEF SUMMARY OF THE INVENTION

Therefore, it is a primary object, feature, or advantage of the present invention to improve over the state of the art.

It is a further object, feature, or advantage of the present invention to provide a flexible physical harness (grip) which facilitates a user's handling of a tablet computer device, making it easier and more convenient to hold in one hand, while at the same time keeping available all of its functions, and providing some protection against damage to the tablet.

One or more of these and/or other objects, features, or advantages of the present invention will become apparent from the specification and claims that follow. The present invention is not to be limited to or by these objects, features, or advantages. No single embodiment of the present invention need provide each and every object, feature, or advantage.

According to one aspect a harness for a tablet computer having a display side and an opposite back side. The harness includes a one-piece harness body formed of a single material and shaped to fit against the back side of the tablet computer. There are openings at each of the four corners of the harness body to create loops for fitting over corners of the tablet computer on the display side. There is a first strap extending across the harness body proximate a center of the harness body between openings in the harness body.

According to another aspect, a harness for a tablet computer having a display side and an opposite back side is provided. The harness includes a one-piece harness body consisting of rubber and shaped to fit against the back side of the tablet computer. The harness further includes openings at each of the four corners of the harness body to create loops for fitting over corners of the tablet computer such that a portion of the loops are positioned on the display side of the tablet computer to secure the harness to the tablet computer. The harness further includes a horizontal strap extending across a center of the harness body between openings in the harness body and a vertical strap extending across the center of the harness body between openings in the harness body.

According to another aspect, a method of gripping a tablet computer having a display side and an opposite back side is provided. The method includes providing a harness, the harness comprising a one-piece harness body formed of a single material and shaped to fit against the back side of the tablet computer. There are openings at each of four corners of the harness body to create loops for fitting over corners of the tablet computer on the display side, and a first strap extending across the harness body proximate a center of the harness body between openings in the harness body. The method further includes fitting the harness to the tablet computer by placing each of the four corners of the tablet computer into the loops of the harness body.

BRIEF DESCRIPTION OF THE ILLUSTRATIONS

DETAILED DESCRIPTION OF THE PREFERRED EMBODIMENTS

Figure 1:
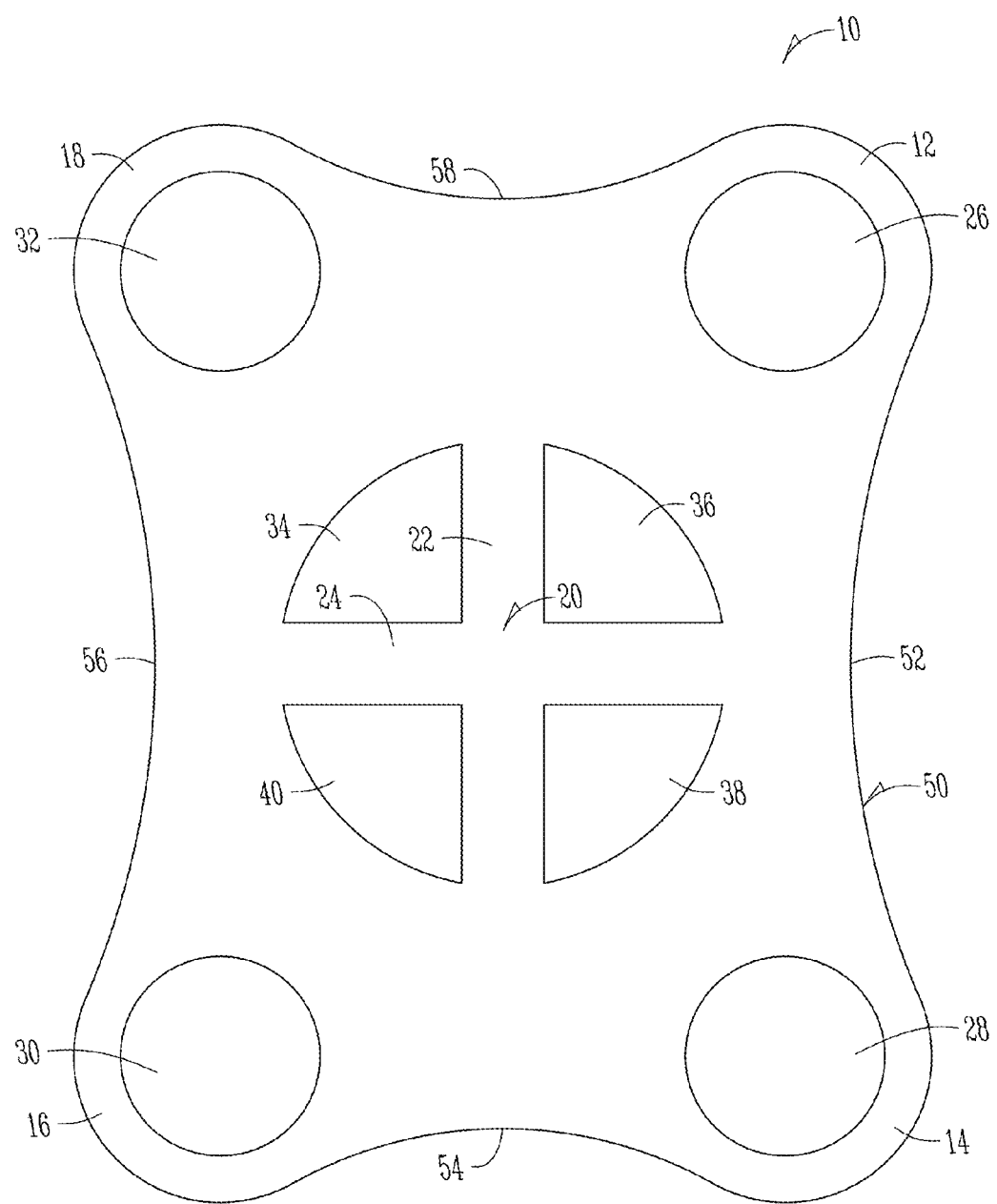
FIG. 1 shows one embodiment of the present invention.

FIG. 1 shows one embodiment of the present invention. In FIG. 1, the harness 10 includes a loop 12, 14, 16, 18 at each of the four corners to physically hold the present invention to a tablet computer device. The harness may be formed of various materials. Preferably, the harness has a one-piece harness body formed of a single material which may be an elastomeric material such as rubber. At the center 20, a vertical 22 and a horizontal strap 24 cross to form a grip. The vertical strap 22 and horizontal strap 24 extend across separate openings 34, 36, 38, 40 into quadrants. Openings 26, 28, 30, 32 are positioned at the corners.

Figure 2:
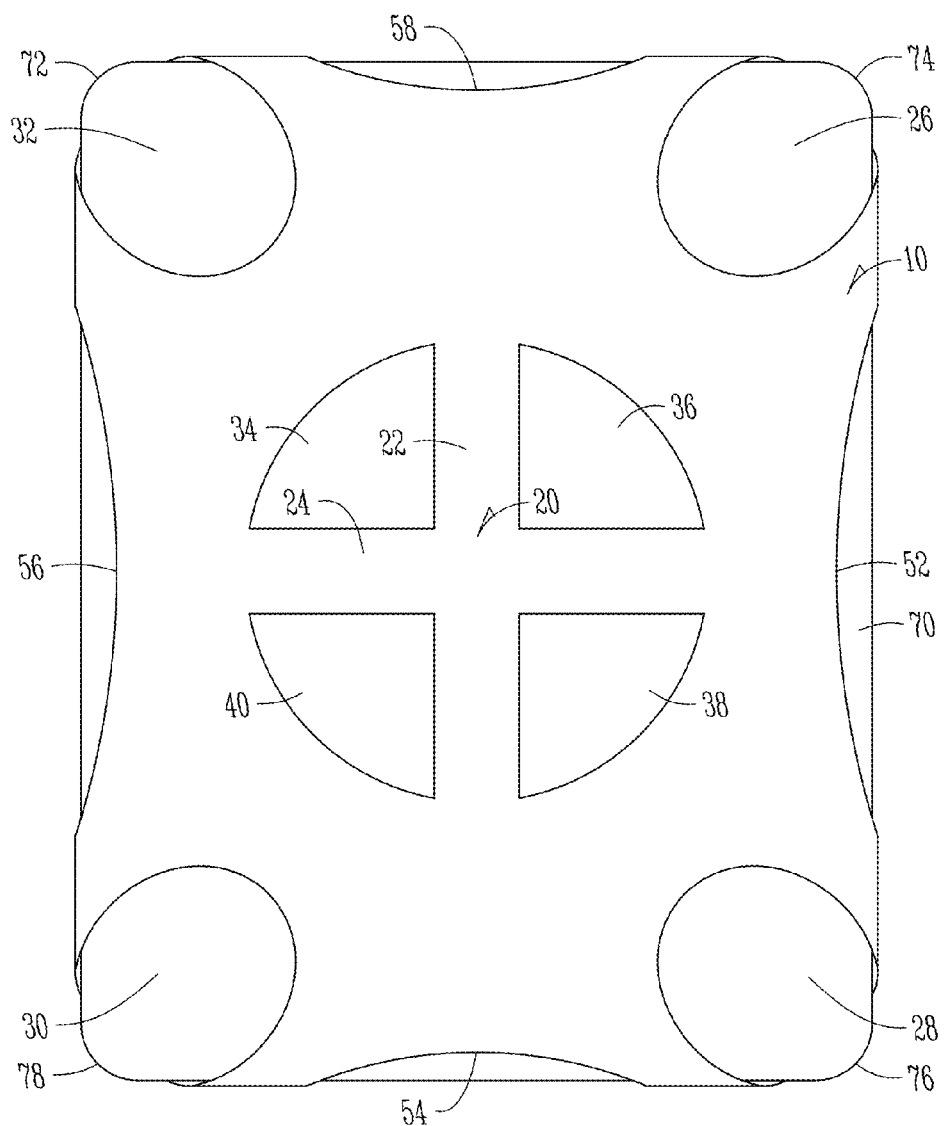
FIG. 2 shows the present invention mounted upon a tablet computer device.

The perimeter 50 of the harness 10 has concave portions 52, 54, 56, 58. The use of these concave portions and their placement allows for the harness to avoid interfering with user controls or connectors of the table computer. In FIG. 2 the harness 10 of the present invention is shown mounted on a tablet computer 70. Note that the corners 72, 74, 76, 78 of the tablet device 70 each extend through one of the loops 32, 26, 28, 30 of the harness 10. Note also that placement of the concave portions allows for user controls and connectors of the table device 70 to remain uncovered and accessible.

Figure 3:
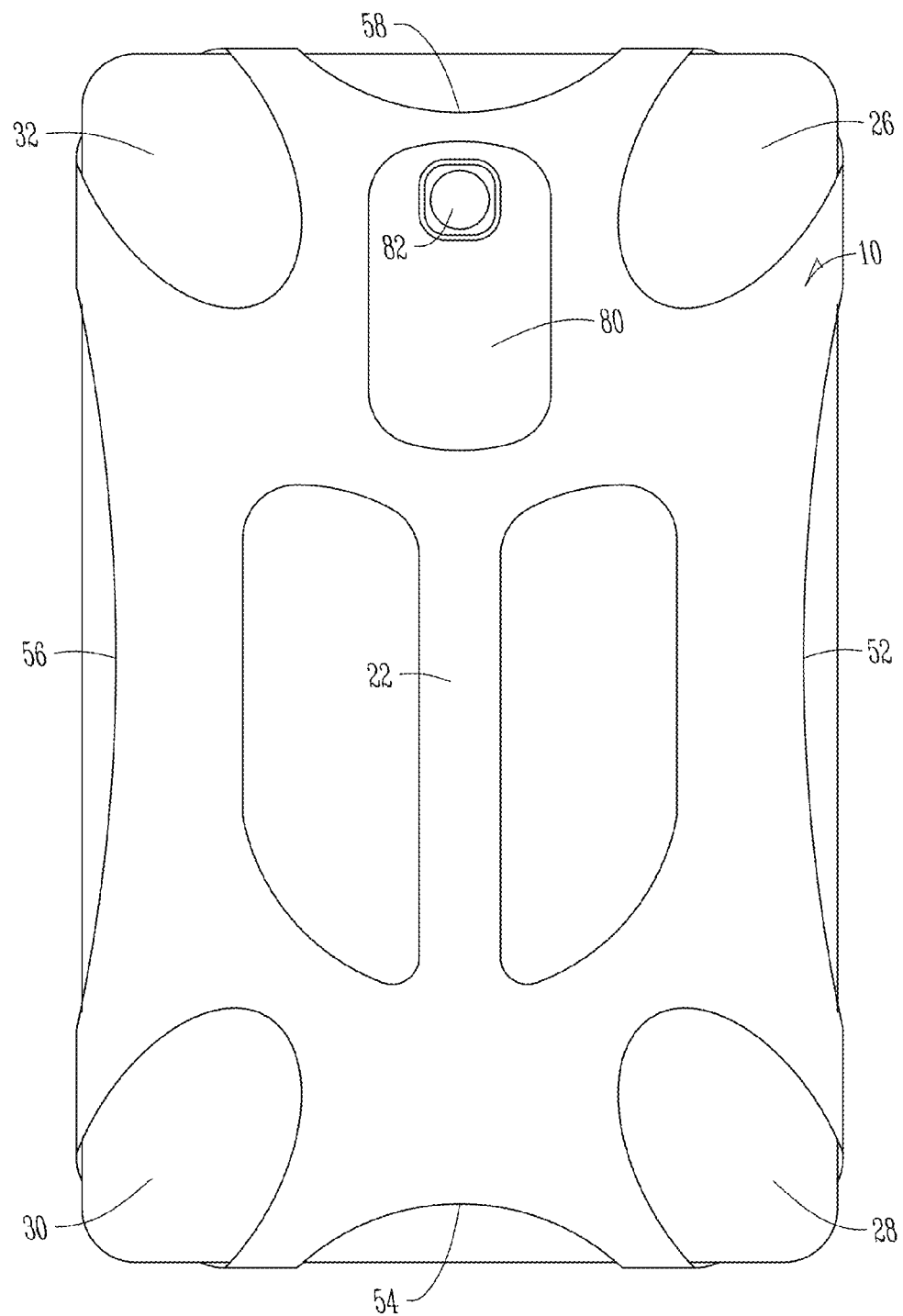
FIG. 3 shows the present invention adapted to a particular device and style of grip.
Figure 4:
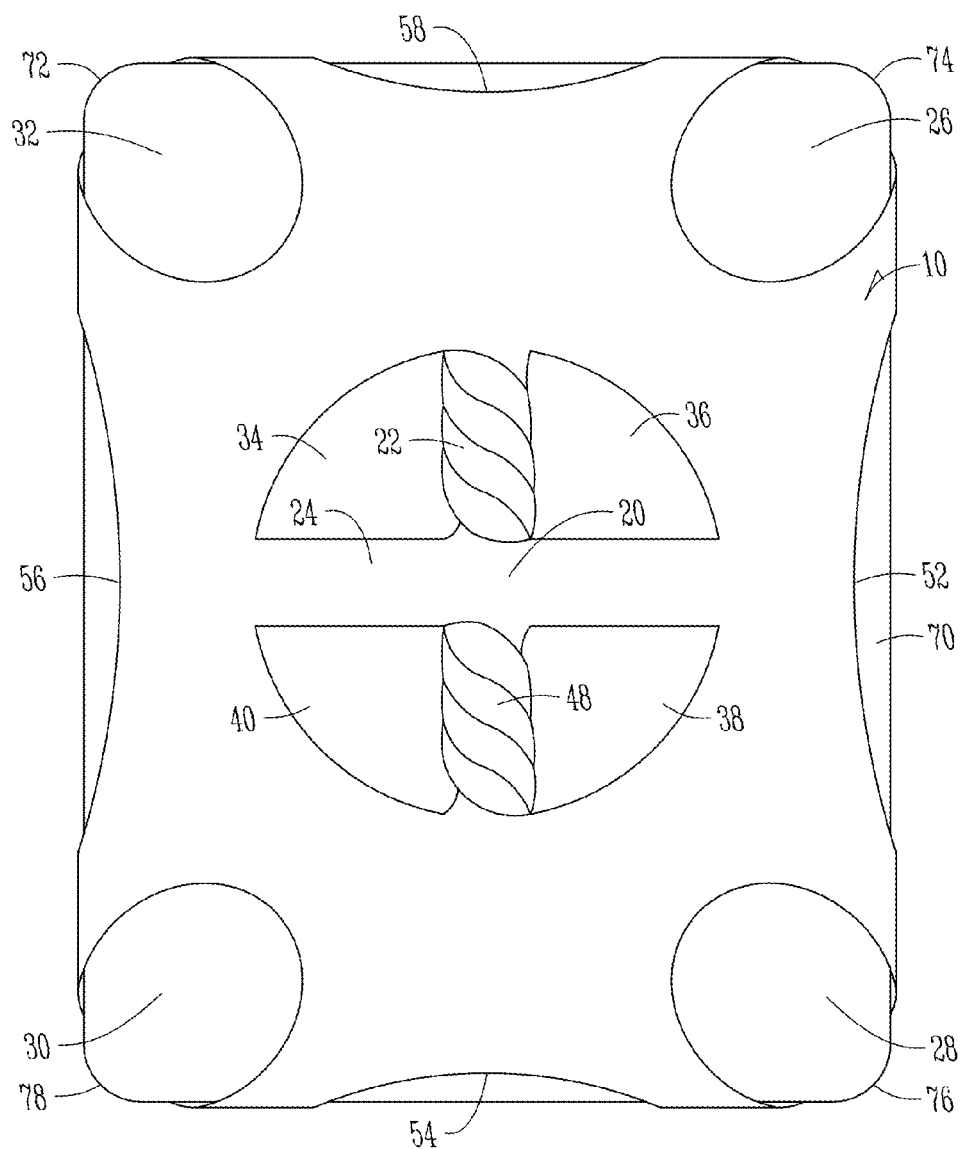
FIG. 4 shows the present invention augmented with a handle for a grip.
Figure 5:
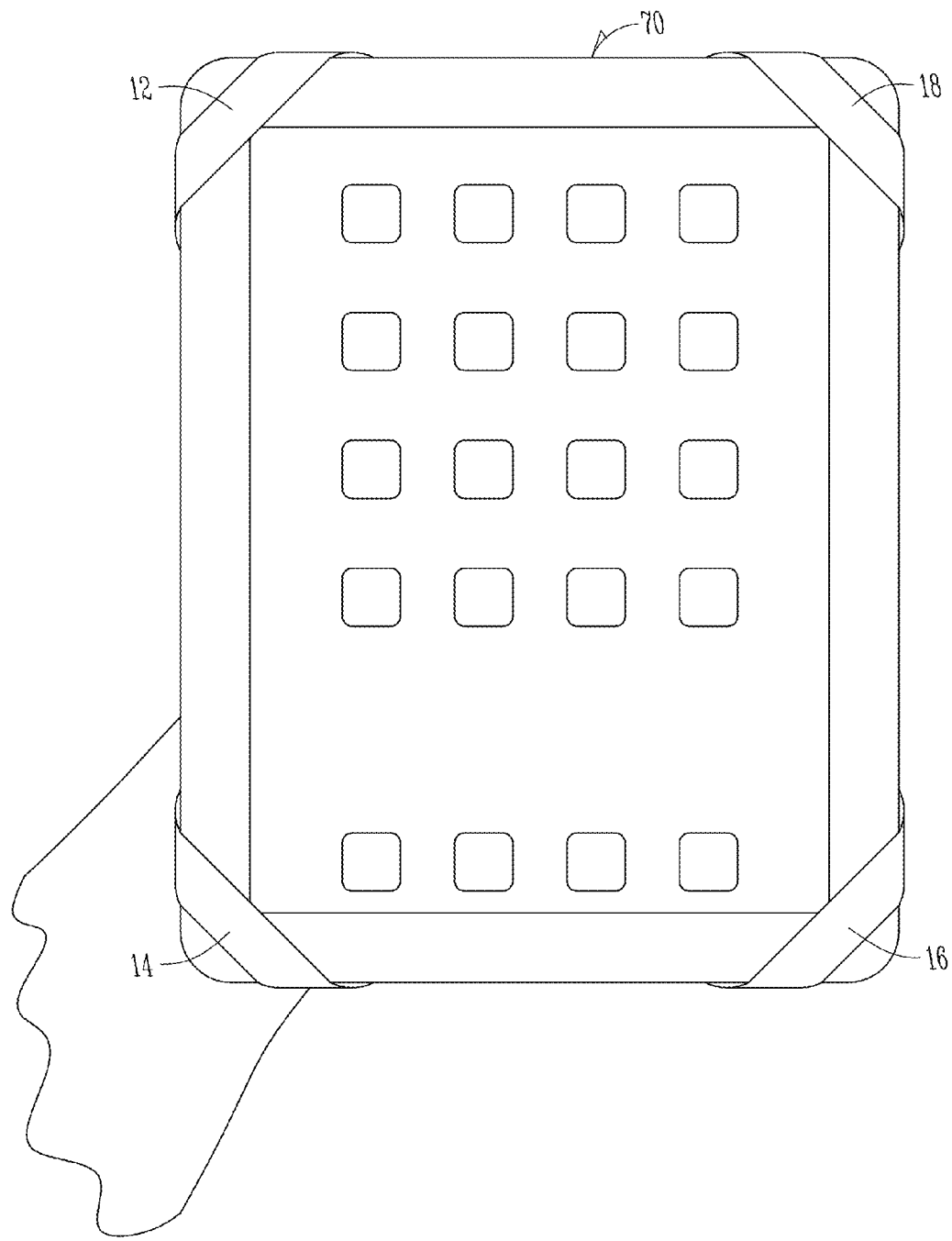
FIG. 5 shows a front view of the present invention in use.
Figure 6:
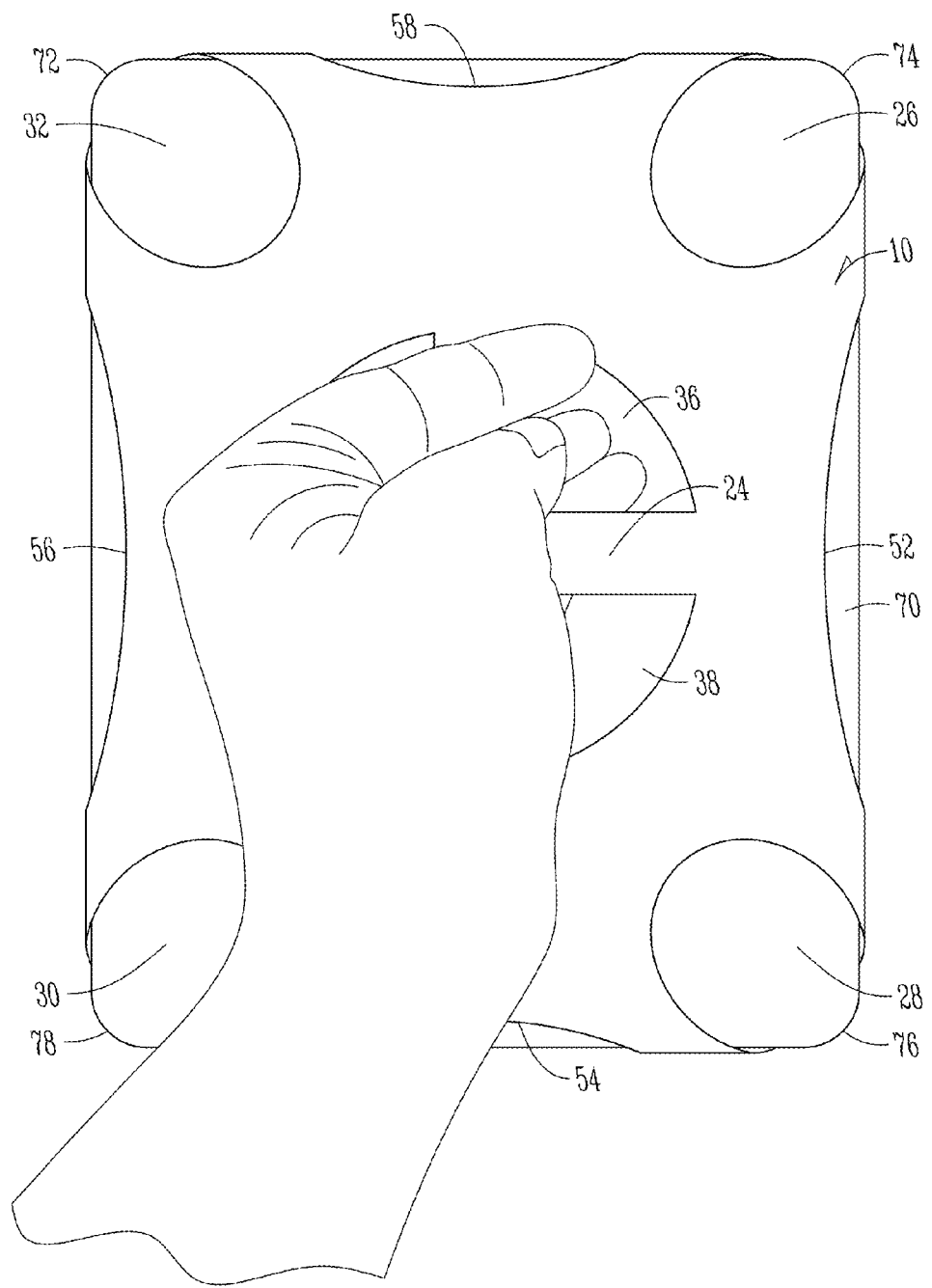
FIG. 6 shows a rear view of the present invention in use.

FIG. 3 shows the present invention modified to allow clearance for various "hot" areas of a tablet computer device and also with the horizontal grip removed to accommodate the preferences of a user. Note that the harness 10 has an opening 80 surrounding a camera 82. FIG. 4 shows the present invention augmented with a (spiral wrap) handle a 48 on its vertical grip strap 22. Double-sided hook and loop fasteners (such as VELCRO) or other types of material may also be used. The handle 48 is removable. Alternatively, the handle 48, if present, may be placed on the horizontal strap or both. The handle or handles may be removed to allow the device to lay flat. FIG. 5 shows the present invention in hand and being held for display or use. FIG. 6 shows the present invention in hand being held for transport or manipulation.

In operation, the harness may be used to assist in gripping a tablet computer. This may be achieved by fitting the harness to the tablet computer by placing each of the four corners of the tablet computer into the loops of the harness body. The concave portions of the harness may align with user controls or connectors such that the user controls or connectors are not covered by the harness. Openings in the harness may also be aligned with user controls, connectors, cameras, or logos so as not to interfere with functioning of the tablet computer. It is contemplated that the harness may be easily cut or trimmed such with scissors or a knife if necessary to customize or adapt the harness body to better accommodate a specific device or to better accommodate user preferences. Once the harness is properly fitted to the tablet computer a user may grip the harness using one or more straps of the harness.

Therefore, a harness for a tablet computer has been shown and described herein. Although various specific embodiments have been shown, the present invention contemplations numerous variations, options, and alternatives. These include options in the type of materials, options in the shape of various openings within the harness body, options in the placement of concave portions around the perimeter, variations in the number and placement of straps, options regarding the use of a wrap around one or more straps, and other variations in structure or function. The present invention is not to be limited to the specific embodiments shown and described herein.

What is claimed is:

1. A harness for a tablet computer having a display side and an opposite back side, the harness comprising:
   a homogenous one-piece harness body formed of a single material and shaped to fit against the back side of the tablet computer, said harness body comprising one or more corners;
   one or more loops proximate the one or more corners, said one or more loops configured to encircle a corresponding corner of the tablet computer; and
   a first strap extending across the harness body proximate a center of the harness body between openings in the one-piece harness body.

2. The harness of claim 1 wherein the material is rubber.

3. The harness of claim 1 further comprising a second strap extending across the harness body, wherein orientation of the second strap is perpendicular to orientation of the first strap.

4. The harness of claim 3 further comprising a wrap around at least one of the first strap or the second strap.

5. The harness of claim 1 further comprising a plurality of concave portions around a perimeter of the harness body such that user controls or connectors of the tablet computer remain uncovered by the harness.

6. The harness of claim 1 further comprising a camera opening in the harness body to expose a camera of the tablet computer located on the back side of the tablet computer.

7. The harness of claim 1 further comprising an aperture in the harness body to allow access to the back side of the tablet computer.

8. The harness of claim 7 further comprising a plurality of concave portion around a perimeter of the harness body such that user controls or connectors of the tablet computer remain uncovered by the harness.

9. A harness for a tablet computer having a display side and an opposite back side, the harness comprising:
   a homogenous one-piece harness body consisting of rubber and shaped to fit against the back side of the tablet computer, said harness body comprising at least one corner;
   at least one loop proximate the at least one corner, said at least one loop configured to encircle a corner of the tablet computer;
   an opening in the harness body for placement at the back side of the tablet computer;
   a horizontal strap extending across a center of the harness body between openings in the harness body; and
   a vertical strap extending across the center of the harness body between openings in the harness body.

10. The harness of claim 9 further comprising a wrap around at least one of the horizontal strap or the vertical strap.

11. The harness of claim 9 further comprising a camera opening in the harness body to expose a camera of the tablet computer located on the back side of the tablet computer.

12. The harness of claim 9 further comprising an aperture in the harness body provide access to the back side of the tablet computer.

13. A method of gripping a tablet computer having a display side and an opposite back side, the method comprising:
   providing a harness, the harness comprising a homogenous one-piece harness body formed of a single material and shaped to fit against the back side of the tablet computer, said harness body comprising at least one corner, at least one loop proximate the at least one corner configured to encircle a corner of the tablet computer, and a first strap extending across the harness body proximate a center of the harness body and between openings in the harness body; and
   fitting the harness to the tablet computer by placing the at least one loop of the harness around the corner of the computer tablet.

14. The method of claim 13 wherein the harness further comprises a plurality of concave portions around a perimeter of the harness body and wherein the fitting comprises aligning the concave portions with user controls or connectors such that the user controls or connectors are not covered by the harness.

15. The method of claim 14 wherein the material is an elastomeric material.

16. The method of claim 15 wherein the elastomeric material is rubber.

17. The method of claim 13 further comprising cutting portions of the harness body to remove portions of the harness body to assist with the fitting or to adapt to user preferences.

18. The method of claim 13 further comprising gripping the tablet computing using the first strap of the harness.

* * * * *